US006859582B2

(12) United States Patent
Cai et al.

(10) Patent No.: US 6,859,582 B2
(45) Date of Patent: Feb. 22, 2005

(54) DUAL-WAVELENGTH HYBRID WAVEGUIDE COUPLER

(75) Inventors: Ming Cai, Newark, CA (US); Kerry J. Vahala, San Gabriel, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/007,630

(22) Filed: Nov. 9, 2001

(65) Prior Publication Data

US 2002/0094168 A1 Jul. 18, 2002

Related U.S. Application Data

(60) Provisional application No. 60/247,934, filed on Nov. 9, 2000.

(51) Int. Cl.[7] ................................................. G02B 6/26
(52) U.S. Cl. .............................. 385/30; 385/28; 385/29; 385/42; 385/43; 385/50
(58) Field of Search .............................. 385/28, 29, 30, 385/42, 43, 50

(56) References Cited

U.S. PATENT DOCUMENTS

| | | | | |
|---|---|---|---|---|
| 3,779,628 A | * | 12/1973 | Kapron et al. ................. | 385/43 |
| 5,074,633 A | | 12/1991 | Cohen et al. | |
| 5,295,211 A | | 3/1994 | Weidman | |
| 5,530,781 A | * | 6/1996 | Takahashi ...................... | 385/43 |
| 5,742,633 A | * | 4/1998 | Stone et al. ................... | 372/92 |
| 5,926,496 A | * | 7/1999 | Ho et al. ....................... | 372/92 |
| 6,275,627 B1 | | 8/2001 | Wu | |

OTHER PUBLICATIONS

Little et al. "Analytical theory of coupling from tapered fibers and half–blocks into microsphere resonators", Journal of Lightwave Technology, vol. 17, No. 4, pp. 704–715, Apr., 1999.*
Knight, et al., "Optics Letters", vol. 22 pp. 1129–1131 (1997).
Cai et al., "Fiber–Optic Add–Drop Device Based on a Silica Microsphere–Whispering Gallery Mode System", IEEE Photon. Technol. Lett., vol. 11(6), pp. 686–687 (1999).
Ming Cai et al., "Fiber–Optic Add–Drop Device Based on a Silica Microsphere–Whispering Gallery Mode System", IEEE Photon. Technol. Lett., vol. 11, No. 6, pp. 686–687, Jun., 1999.
M. Cai et al., "Fiber–coupled microsphere laser", Optics Letters, vol. 25, No. 19, pp. 1430–1432, Oct. 1, 2000.
M. L. Gorodetsky et al., Ultimate Q of optical microsphere resonators, Optics Letters, vol. 21, No. 7, pp 453–455, Apr. 1, 1996.
J. C. Knight et al., "Phase–matched excitation of whispering–gallery–mode resonances by a fiber taper", Optics Letters, vol. 22, pp. 1129–1131, 1997.
V. Sandoghdar et al., "Very low threshold whispering–gallery–mode microsphere laser", Physics Review A, vol. 54, No. 3, pp. R1777–R1780, Sep. 1996.

* cited by examiner

*Primary Examiner*—Robert H. Kim
*Assistant Examiner*—Michael H. Caley
(74) *Attorney, Agent, or Firm*—Fish & Richardson P.C.

(57) ABSTRACT

A hybrid and tapered waveguide coupler that has two different single-mode waveguide sections for light at two different wavelengths to couple light at the two different wavelengths into or out of an optical device located in a reach of an evanescent field of the guided optical energy in the waveguide coupler.

29 Claims, 3 Drawing Sheets

DUAL-WAVELENGTH HYBRID WAVEGUIDE COUPLER

This application claims the benefit of U.S. Provisional Application No. 60/247,934, entitled "Hybrid Fiber Taper Coupled Microsphere Laser" and filed Nov. 9, 2000.

The U.S. Government has certain rights in this invention pursuant to AFOSR Contract No. F49620-97-1-0430.

BACKGROUND

This application relates to coupling of optical energy from one optical device to another, and more particularly, to techniques and devices for coupling optical energy based on evanescent waves such as coupling optical energy into or out of a whispering-gallery-mode cavity.

Many optical devices and systems involve coupling optical energy from one optical element or device to another optical element or device. An optical device that accomplishes such optical coupling is an optical coupler. For example, a partially reflective and partially transmissive reflector, a beam splitter, or a direction fiber coupler may be used as an optical coupler in various applications.

Some optical couplers are designed to couple optical energy by evanescent coupling in which an optical interface is provided to allow optical energy in an evanescent field of an optical signal in one optical element or device to be extracted and received by another optical element or device. An optical prism, for example, may be used to operate as such an optical coupler when an optical signal received by the prism is totally internally reflected at one prism facet. The energy distribution of the totally reflected beam, however, is not entirely confined within the prism but penetrates through that prism facet to extend outside the prism in a near-field region on the order of or less than one wavelength of the optical signal. The optical field outside the prism facet is the evanescent field and decays exponentially with the distance from the prism facet. An optical element or device can be placed in the near-field region to receive a portion of the reflected optical signal.

One application of the optical evanescent coupling is whispering-gallery-mode optical cavities. Whispering-gallery-mode optical cavities formed from glass micro spheres have been demonstrated to exhibit high quality factors (Q's). See, e.g., Gorodetsky et al., "Ultimate Q of Optical Microsphere Resonators," Optics Letters, Vol. 21(7), pp.453–455 (1996). The microsphere can be designed to support a special set of resonator modes known as "whispering gallery modes." A whispering gallery mode is essentially an electromagnetic field mode that is confined in an interior region close to the surface of the sphere around its equator and circulates by total internal reflection at the sphere surface. Light need be launched into the cavity from a phase-matched evanescent wave in order to excite a whispering gallery mode. Likewise, light in a whispering gallery mode in the cavity need be coupled out of the cavity by evanescent coupling.

Such evanescent coupling may be achieved in a number of ways. One technique, for example, uses a prism spaced from the micro sphere by a sub-micron gap to produce an evanescent in the gap by total internal reflection in the prism. See, e.g., Gorodetsky et al., supra. and Sandoghdar et al., "Very Low Threshold Whispering-Gallery-Mode Microsphere Laser," Physics Review A, Vol.54(3), pp. 777–1780 (1996). In another technique, a tapered single-mode fiber coupler is formed by pulling the fiber under a heated condition to form a narrow neck of the tapered portion (e.g., about 1 to 3 microns) to allow for evanescent leaking of the guided optical energy at the neck to couple energy into or out of the micro sphere. See, e.g., Knight et al., Optics Letters, Vol.22 pp.1129–1131 (1997) and Cai et al., "Fiber-Optic Add-Drop Device based on A Silica Microsphere-Whispering Gallery Mode System," IEEE Photon. Technol. Lett., Vol.11(6), pp.686–687 (1999).

SUMMARY

This application includes techniques and devices to use a single waveguide optical coupler to evanescently couple light of two different wavelengths into or out of an optical device. The waveguide optical coupler has a hybrid waveguide structure with a first waveguide section that supports a single mode for light at a first wavelength, a second waveguide section that supports a single mode for light at a second wavelength, and a tapered waveguide section connected between the first and second waveguide sections to support at least one mode at the first wavelength and one mode at the second wavelength. The transition from either of the first and the second waveguides to the middle tapered waveguide section satisfies the optical adiabatic transformation to allow optical energy in a single mode to be converted into energy in a mode in the tapered section. The tapered waveguide section has a narrow geometry to allow for evanescent coupling with another optical device that is placed in contact with or near the tapered waveguide section with a spacing less than or on the order of one optical wavelength to couple light at both the first and the second wavelengths.

This hybrid waveguide coupler may be used for evanescently coupling light at the first wavelength into a whispering-gallery-mode micro cavity while evanescently coupling light of the second, different wavelength in a whispering gallery mode in the cavity out of the micro cavity. The micro cavity may be a micro sphere or may have a geometrical configuration other than a sphere to support whispering gallery modes at the first and the second wavelengths.

In general, the above hybrid waveguide coupler may be formed of any suitable optical waveguide, such as optical fibers and planar waveguides fabricated on substrates. In one implementation, for example, the hybrid waveguide coupler is a hybrid and tapered fiber coupler formed by splicing together a first single-mode fiber for light at a first wavelength and a second single-mode fiber for light at a second wavelength. A tapered fiber region is formed at the joint between the two fibers that supports at least one mode at each of the two different wavelengths.

DETAILED DESCRIPTION

Optical waveguides, such as fibers and planar waveguides, guide optical energy by total internal reflection at the boundary of their waveguide cores which have refractive indices higher than the surrounding media. The evanescent field in the near-field region outside the waveguide core, usually with a spatial extent on the order of or less than one wavelength of the guided optical energy, can be exposed to another optical element or device for evanescent coupling. The dual-wavelength hybrid waveguide optical couplers of this application are designed to have a tapered waveguide section between a first waveguide section that supports a single mode for light at a first wavelength and a second waveguide section that supports a single mode for light at a second wavelength. The three waveguide sections may be formed of fibers, planar waveguides, or a mixture of both. The tapered waveguide section is designed to support at least one mode at the first wavelength and one mode at the second wavelength and has a gradual transition region in its connection to either of the first and the second waveguide sections to satisfy the optical adiabatic transformation. Hence, optical energy in a single mode at the either of the two wavelengths can be converted into energy in a mode in the tapered section. The tapered waveguide section has a narrow geometry to allow for evanescent field of a guided optical mode to extend outside the tapered waveguide section for evanescent coupling with an optical element. This optical element may be an optical cavity or other non-cavity elements.

Figure 1:
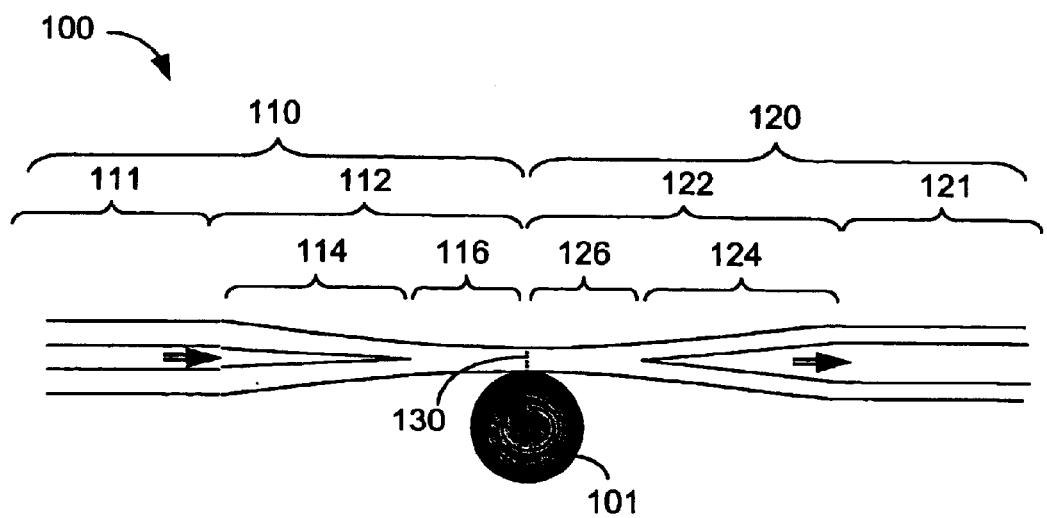
FIG. 1 shows one embodiment of a hybrid and tapered fiber coupler for simultaneously and evanescently coupling light of two different wavelengths into or out of a whispering-gallery-mode micro cavity.

FIG. 1 shows one embodiment of a hybrid and tapered fiber coupler 100 for coupling light at two different wavelengths into or out of an optical device 101 which is shown to be a whispering-gallery-mode micro cavity as an example. The fiber coupler 100 has two different fiber portions 110 and 120 that are spliced together at a joint interface 130. The first fiber portion 110 is formed from a single-mode fiber for light at a first wavelength and has a untapered portion 111 and a tapered portion 112. The second fiber portion 120 is formed from a single-mode fiber for light at a second wavelength and has a untapered portion 121 and a tapered portion 122. Assuming the second wavelength is longer than the first wavelength, the fiber core of the untapered fiber portion 111 is less than the fiber core of the untapered fiber portion 121 in diameter. In operation, the fiber coupler 100 may be placed near the micro cavity 101 by positioning the center tapered portion at or near the joint interface 130 from the micro cavity 101 by the spacing on the order of or less than one wavelength of the smaller of the first and second wavelengths. Alternatively, the tapered region may be in direct contact with the surface of the micro cavity 101.

The tapered portion of each fiber section may be formed by pulling untapered fiber under a heated condition. This pulling produces a gradual transition from the untapered portion 111 or 121 to the tapered portion 112 or 122. The tapered portion 112 or 122 may be generally divided into a first tapered section 114 or 124 adjacent to the untapered section 111 or 121, and a second tapered section 116 or 126 adjacent to the joint interface 130. In the first tapered section 112 or 122, the fiber core gradually decreases in diameter towards the direction of the joint interface 130 and still guides the light. In the second tapered section 114 or 124, however, the diameter of the fiber core becomes too small to have any practical effect on the guided light and the section essentially is a tapered waveguide formed of the fiber cladding and surrounded by the air, or other optically less dense surrounding media or ambient environment in the space where the micro cavity 101 is located. Hence, the guided light in the second tapered section 114 or 124 is confined by the interface between the optical cladding material and the surrounding environment such as the air. The evanescent field of the guided optical energy in the tapered section therefore extends into the surrounding area outside the tapered section to interact with an optical element (e.g., the micro cavity 101) located within the reach of the evanescent field. End facets 118 and 128 of the second tapered portions 116 and 126, respectively, are fused together to form the joint interface 130. In general, the untapered fiber sections 111 and 112 have the fiber core in the center and fiber cladding surrounding the fiber core. The thickness of the fiber cladding is much greater than one wavelength of the guided optical energy, e.g., tens of microns, to completely confine the evanescent field within the fiber. The fiber coupler 100 is "hybrid" because two different single-mode fibers are combined and because light of two different wavelengths may be coupled to the micro cavity 101.

The second tapered fiber sections 116 and 126 may be designed to support only a few modes for light at both the first and the second wavelengths. Hence, the relative position of the micro cavity 101 and the fiber coupler 100 can be adjusted to achieve the desired phase matching for efficient optical coupling, i.e., the fiber mode at the first wavelength in the tapered region matches the whispering gallery mode at the first wavelength in the micro cavity and the fiber mode at the second wavelength in the tapered region matches the whispering gallery mode at the second wavelength in the micro cavity. This design avoids the selection of a large number of modes in the evanescent coupling with a micro prism and simplifies the control in the relative positioning of the cavity 101 with respect to the coupler. The all fiber construction of the fiber coupler 100 is beneficial for integrating the micro cavity 320 into fiber devices and systems.

Notably, light in each of the two different fiber portions 110 and 120 experiences three transition regions in the optical waveguide structure. In the example of the fiber portion 110, the transition regions are: the first transition region from the first untapered fiber 111 to the first tapered fiber section 112, the second transition region from the first tapered fiber section 114 to the second tapered section 116 within the first tapered fiber section 112, and the third transition region to cross the joint interface 130. Each transition region may be optically "gradual," to allow for evolution of optical energy from an optical waveguide mode on one of side of the transition region into another optical waveguide mode on the opposite side of the transition region. Under such an optically gradual transition, for example, optical energy in a single mode at the first wavelength supported by the waveguide formed by the fiber core and the fiber cladding in the untapered region 111 can be transferred into a different waveguide mode at the first wavelength supported by the waveguide formed by the fiber cladding material in the second tapered region 116. Hence, optical energy can be transferred from one side of the optical waveguide to another side of optical waveguide without significant optical loss although the structure of the optical waveguide and hence the waveguide mode change.

The above gradual transition is known as an optical adiabatic transformation condition. See, for example, Chapter 19 of "Optical Waveguide Theory," by A. W. Snyder and J. D. Love (Chapman and Hall, 1983). In general, the optical adiabatic transformation condition requires that, a change in the structure of the waveguide along the waveguide is less than a predetermined percentage over a distance greater than the beat length $Z_b$. The beat length $Z_b$ is defined by Synder and Love as $2\pi/\Delta\beta_{min}$, where $\Delta\beta_{min}$ is the difference between two closest propagation constants of allowed waveguide modes.

Therefore, the combination of using two different single-mode fibers for inputting or output light at different wavelengths and the gradual tapering of the two different single-mode fibers allows optical energy at two different wavelengths to be coupled into or out of the micro cavity or another optical device without significant optical loss. Notably, the geometry of the tapered section may be in any form that satisfies the adiabatic condition and exposes the evanescent field of the guided optical energy to the external device with which the dual-wavelength coupling is desired.

Figure 2A:
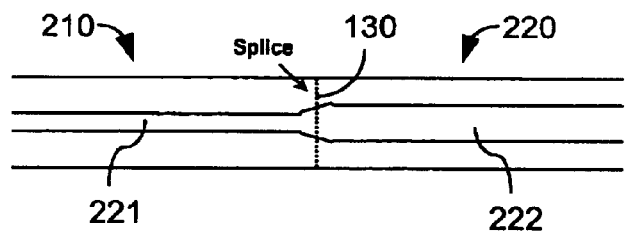
FIGS. 2A and 2B illustrate fabrication of the fiber coupler shown in FIG. 1.
Figure 2B:
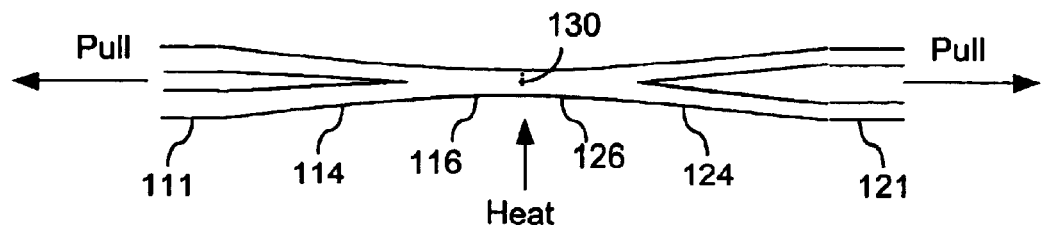

FIGS. 2A and 2B illustrate fabrication of the fiber coupler 100 according to one embodiment. First, two single mode fibers 210 and 220 with fiber cores 211 and 212 of different core diameters are spliced to each other at a joint interface 130 by thermal fusion (FIG. 2A). Next as shown in FIG. 2B, the joint interface 230 and the adjacent portions of the fibers 210 and 220 are heated and the fibers 210 and 220 are pulled in opposite directions along the fiber's longitudinal direction to form the tapered fiber coupler shown in FIG. 1. The amount of pulling is controlled to make each transition region to satisfy the adiabatic transformation condition.

The above dual-wavelength hybrid waveguide couplers such as the fiber coupler 100 may be used in optical applications where coupling of two different wavelengths at the same location is desired. For example, optically-pumped lasers involve the optical pump beam at a pump wavelength and a laser beam at a laser wavelength usually longer than the pump wavelength. The above dual-wavelength hybrid waveguide coupler may be combined with a laser cavity to evanescently couple the pump beam into the laser cavity and to evanescently extract a portion of the laser out of the laser cavity to produce a laser output. The laser cavity may be any cavity that allows for evanescent coupling such as a Fabry-Perot laser cavity or a ring cavity formed in a fiber or a planar waveguide on a substrate where evanescent coupling can be made at a side coupling port on the fiber or the planar waveguide, or a whispering gallery mode cavity as described in detail below.

Figure 3:
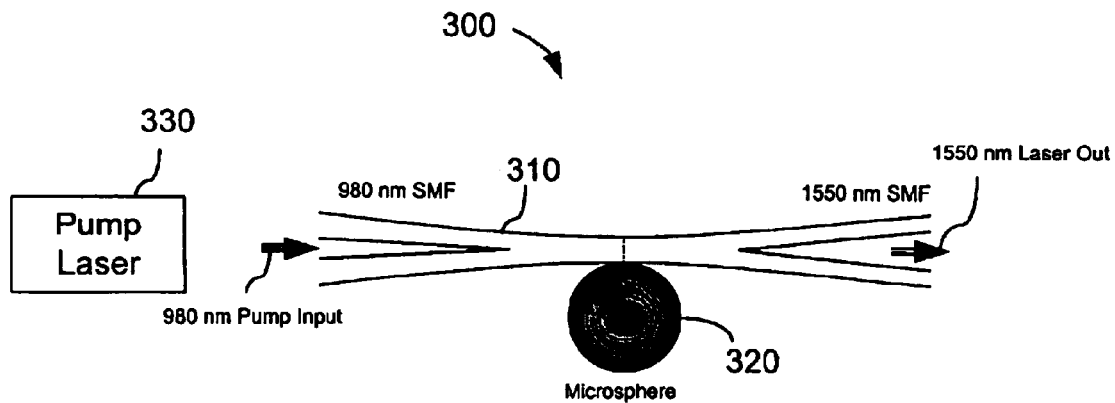
FIG. 3 shows a micro cavity laser by using the fiber coupler shown in FIG. 1 to couple both the pump light and the laser output.

FIG. 3 shows a laser 300 by using a tapered fiber coupler 310 based on the above design and a microsphere laser cavity 320. In this particular embodiment, the fiber coupler 310 is formed from a 980-nm single-mode fiber and a 1550-nm single mode fiber for coupling a 980-nm pump beam into the microsphere 320 and to extract a 1550-nm output laser beam from the microsphere 320. A pump laser 330, which may be a diode laser or diode-pumped laser, is used to produce the 980-nm pump beam.

The microsphere 320 is formed of a doped optical medium as the gain medium. The doped ions in general may be rare-earth ions that have atomic transitions to produce lasers from visible wavelengths to far infrared wavelengths, such as such as erbium, holmium, neodymium, samarium, thulium, ytterbium, or a mixture thereof. Er ions used for producing optical pulses at 1.55 μm can be particularly useful for optical fiber communication since the optical loss in the commonly used silica fibers is minimum at about 1.55 μm. In general, the pump wavelength is usually at a wavelength shorter than the laser wavelength. For example, when the microsphere 320 is a dielectric sphere doped with $Er^{+3}$ ions, the pump at 980 nm may be used to produce a laser beam at 1550 nm.

In operation, the 980-nm pump beam is evanescently coupled into the microsphere 320 from the left portion of the fiber coupler 310. The pump beam coupled into a pump whispering gallery mode in the microsphere 320 is absorbed by the doped ions to produce the laser light in a different laser whispering gallery mode. Both laser and pump whispering gallery modes may circulate in the clockwise direction as illustrated. A portion of the laser light in the laser whispering gallery mode is evanescently coupled through the taper the region of the fiber coupler 310 to the right portion of the coupler 320 as the laser output.

Figure 4A:
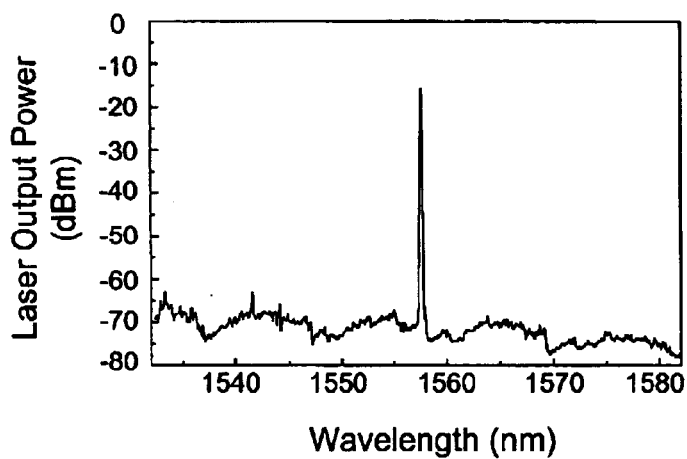
FIGS. 4A, 4B, and 5 show measured results of a laser based on the design in FIG. 3.
Figure 4B:
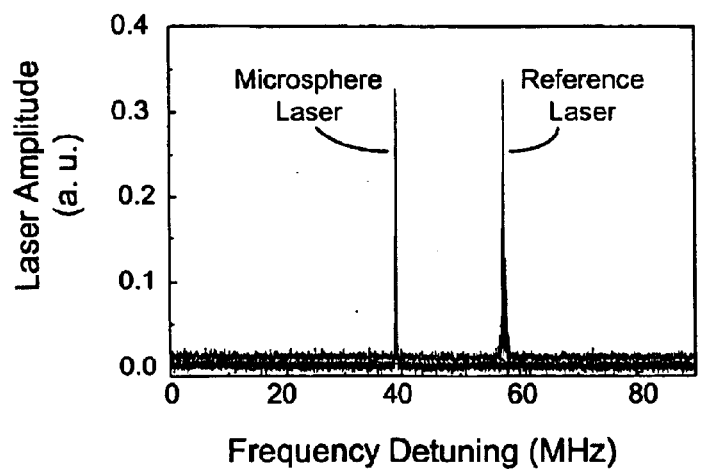
Figure 5:
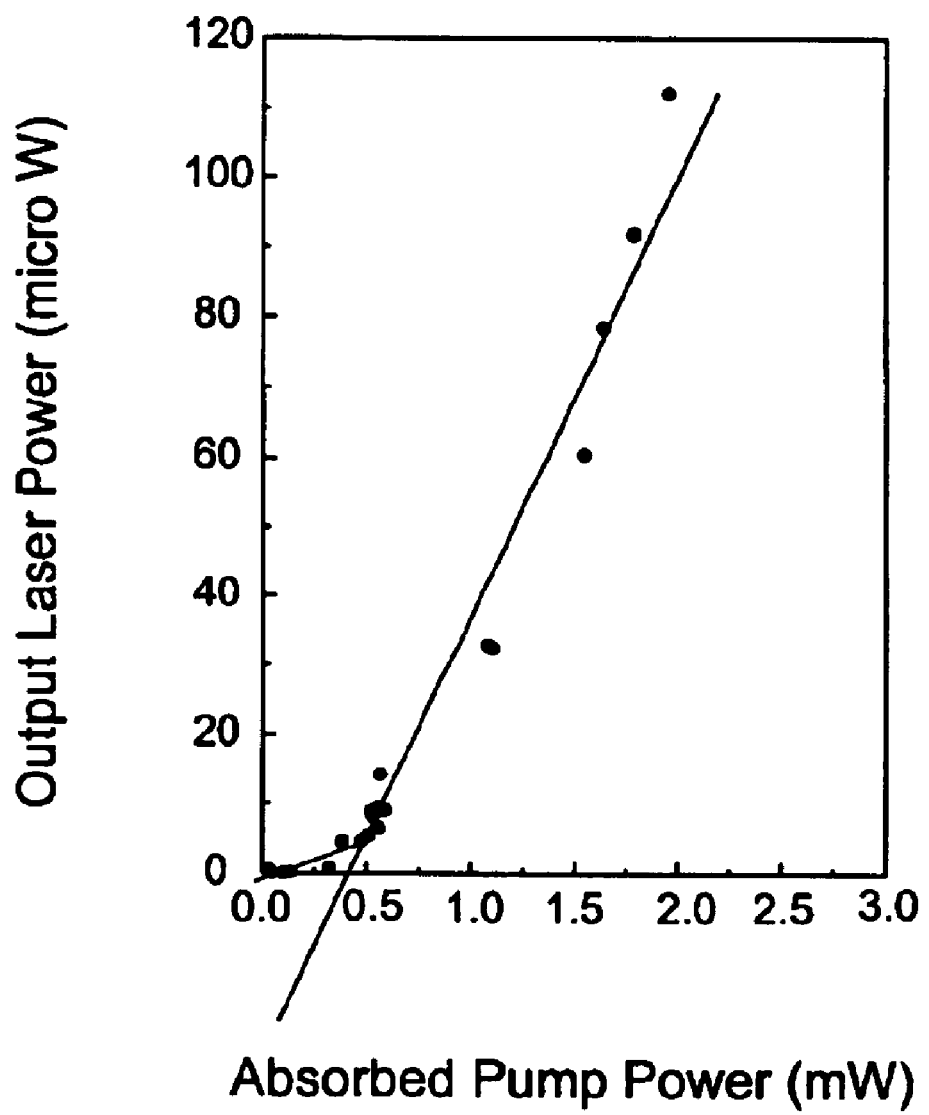

FIGS. 4A, 4B, and 5 show measured results of the microsphere laser 300 where the microsphere 320 a phosphate glass sphere of about 44 microns in diameter and doped with Yb ions at 20% by weight and Er ions at 0.5% by weight. The fully-inverted gain per unit length for the laser transition at the 1.5 micron is about 200 db/m. The spliced fiber in the structure shown in FIG. 2A before forming the taper has an optical loss less than about 0.2 dB. After tapering, the loss is increased by another 0.5 dB. The waist diameter of tapered region near the joint interface of the two fibers is about 1 to 3 microns. The tapered region of the coupler 310 is in direct contact with the microsphere 320 to couple the pump light and the laser light. In operation, the wavelength of the pump beam at 980 nm is tuned and the contact point in the tapered region is adjusted to achieve the laser action and to optimize the optical coupling efficiency.

FIG. 4A shows the output laser spectrum as measured at the output of the 1550-nm fiber in the coupler 310. FIG. 4B further shows the fine spectral features of the laser output by using a canning Fabry-Perot cavity with a spectral resolution of a few MHz and a finesse of about 5000. A single-frequency reference laser with a linewidth of about 300 KHz is also shown as a spectral reference. FIG. 5 shows the output laser power as a function of the total pump power in the microsphere. An output power of about 112 microwatts at about 1557 nm was achieved at an absorbed 980-nm pump power of about 2 mW. The differential quantum efficiency of the laser is $$\eta_d = \frac{P_{laser}}{P_{pump} - P_{th}} \cdot \frac{\lambda_{pump}}{\lambda_{laser}} \approx 12\%,$$

where $P_{pump}$ is the input pump power, $P_{laser}$ is the output laser power, and $P_{th}$ is the pump power at the laser threshold. This is significantly higher than the efficiency of about 2.6% in a microsphere laser with a non-hybrid tapered fiber coupler and the efficiency of about 0.037% of a microsphere laser with a micro prism coupler.

Only a few embodiments are disclosed. However, it is understood that variations and enhancements may be made without departing from the spirit of and are intended to be encompassed by the following claims.

What is claimed is:

1. A device, comprising:
    a first fiber having a first untapered fiber section which is a single-mode fiber for light at a first wavelength and a first tapered fiber section which has one end conforming to and connected to said first untapered fiber section and has a fiber diameter gradually reducing from said one end to another opposing end; and
    a second fiber having a second untapered fiber section and a second tapered fiber section which has one end being spliced to said another opposing end of said first tapered fiber section and another end conforming to and connected to said second untapered fiber section, wherein a fiber diameter of said second tapered fiber section gradually decreases from said one end to said another end, and
    wherein said second untapered fiber section is a single-mode fiber for light at a second wavelength and has a core diameter greater than a diameter of a fiber core of said first untapered fiber section.

2. The device as in claim 1, wherein each fiber has a structural variation from a respective untapered fiber section to a respective tapered fiber section that satisfies an optical adiabatic transformation condition to transform optical energy in a single mode in either of said first and said second untapered fiber sections in said first and said second wavelengths, respectively, into optical energy in a mode in said first and said second tapered fiber sections.

3. The device as in claim 1, further comprising an optical element located in an evanescent field of guided optical energy in one of said first and said second tapered fiber sections to evanescently exchange optical energy at said first wavelength with said first fiber and exchange optical energy at said second wavelength with said second fiber.

4. The device as in claim 3, wherein said optical element includes a micro cavity that supports at least one whispering gallery mode at said first wavelength and one whispering gallery at said second wavelength.

5. The device as in claim 4, wherein said micro cavity is in direct contact with a respective tapered fiber section of one of said first and said second fibers.

6. The device as in claim 4, wherein said micro cavity is spaced from a respective tapered fiber section of one of said first and second fibers.

7. The device as in claim 4, wherein said micro cavity is a sphere.

8. The device as in claim 4, wherein said micro cavity is not a sphere.

9. The device as in claim 3, wherein said optical element is located to evanescently receive light at said first wavelength received from said first untapered fiber section and to evanescently couple light at said second wavelength through one of said first and said second tapered fiber sections into said second untapered fiber section.

10. The device as in claim 9, wherein said optical element includes an optical cavity.

11. The device as in claim 10, wherein said optical cavity is a ring cavity.

12. The device as in claim 10, wherein said optical cavity is a Fabry-Perot cavity.

13. A device, comprising:
an optical fiber coupler having a tapered fiber section formed of a fiber cladding material to form an optical waveguide based on interfacing between said fiber cladding material and air, a first single-mode fiber for light at a first wavelength connected to a first side of said tapered fiber section, and a second single-mode fiber for light at a second wavelength connected to a second side of said tapered fiber section,
wherein said tapered fiber section has a structure to support at least one waveguide mode at said first wavelength and one waveguide mode at said second wavelength, and said first and said second wavelengths are different.

14. The device as in claim 13, wherein each of said first and said second single-mode fibers is connected to said tapered fiber section under an optical adiabatic transformation condition to allow optical energy in a single mode in either of said first and said second single-mode fibers to transform into a waveguide mode in said tapered fiber section.

15. The device as in claim 13, further comprising a micro cavity that supports at least one whispering gallery mode at said first wavelength and one whispering gallery at said second wavelength and absorbs light at said first wavelength to produce light at said second wavelength, said micro cavity located relative to said tapered fiber section to evanescently receive light at said first wavelength from said tapered fiber section and to evanescently couple light at said second wavelength into said tapered fiber section.

16. The device as in claim 15, wherein said micro cavity is in direct contact with said tapered fiber portion.

17. The device as in claim 15, wherein said micro cavity is spaced from said tapered fiber portion.

18. The device as in claim 15, wherein said micro cavity is a dielectric material doped with rare-earth ions.

19. The device as in claim 15, wherein said micro cavity is a sphere.

20. The device as in claim 15, wherein said micro cavity is not a sphere.

21. A device, comprising:
a tapered waveguide section to guide optical energy in at least one mode at a first wavelength and one mode at a second wavelength and to expose an evanescent field of said guided optical energy outside said tapered waveguide section, wherein said first and said second wavelengths are different;
a first waveguide section supporting a first single mode at said first wavelength connected to a first side of said tapered waveguide section to allow for conversion of optical energy between said one mode at said first wavelength in said tapered waveguide section and said first single mode; and
a second waveguide section supporting a second single mode at said second wavelength connected to a second side of said tapered waveguide section to allow for conversion of optical energy between said one mode at said second wavelength in said tapered waveguide section and said second single mode.

22. The device as in claim 21, wherein one of said waveguide sections is formed of a fiber.

23. The device as in claim 21, wherein one of said waveguide sections is formed of a planar waveguide on a substrate.

24. The device as in claim 21, further comprising an optical element located to evanescently couple light at said first wavelength from said tapered waveguide section and to evanescently couple light at said second wavelength into said tapered fiber section.

25. The device as in claim 24, wherein said optical element includes an optical cavity.

26. The device as in claim 25, wherein said optical cavity is a whispering-gallery-mode cavity.

27. A device, comprising:
an optical resonator including a laser gain medium that absorbs light at a first wavelength to produce an optical gain at a second wavelength longer than said first wavelength and to produce laser light at said second wavelength; and
an optical coupler to optically couple light at said first wavelength into said optical resonator and to couple laser light at said second wavelength out of said optical resonator, wherein said optical coupler includes:
a tapered waveguide section, located adjacent to said optical resonator, to guide optical energy at said first wavelength and said second wavelength and to expose an evanescent field of said guided optical energy outside said tapered waveguide section to allow for evanescent coupling with said optical resonator at said first and said second wavelengths,
a first waveguide section supporting a single mode at said first wavelength and connected to a first side of said tapered waveguide section to receive and direct light at said first wavelength to said tapered waveguide sections, and a second waveguide section supporting a second single mode at said second wavelength and connected to a second side of said tapered waveguide section to receive laser light at said second wavelength from said tapered waveguide section to produce a laser output.

28. The device as in claim 27, wherein said first and said second waveguide sections are a first single-mode fiber at said first wavelength and a second single-mode fiber at said second wavelength.

29. The device as in claim 27, wherein said optical resonator is a whispering gallery mode resonator.

* * * * *